J. H. HARDEN.
TRACTION DEVICE FOR VEHICLE WHEELS.
APPLICATION FILED JULY 14, 1915.
1,193,139.
Patented Aug. 1, 1916.
2 SHEETS—SHEET 1.
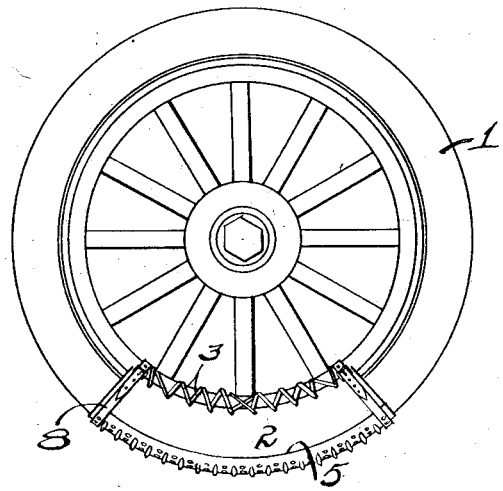
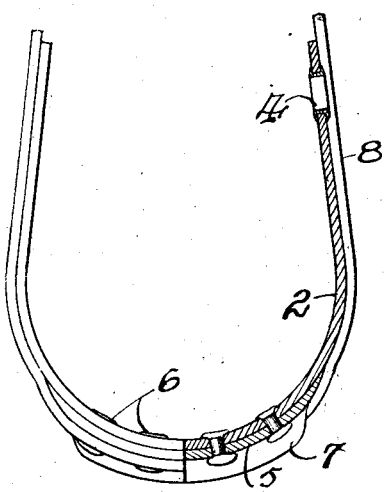
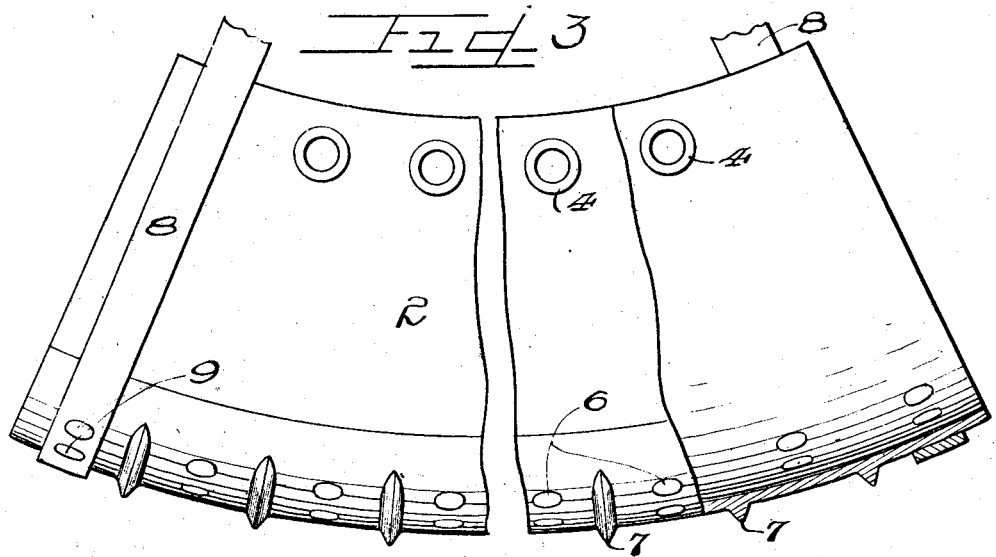
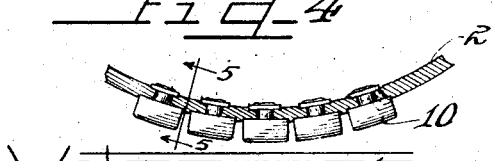
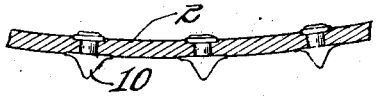
Witnesses
J. W. Angell
Charles W. Hill Jr.
Inventor
James H. Harden
by Charles W. Hill
Atty.

J. H. HARDEN.
TRACTION DEVICE FOR VEHICLE WHEELS.
APPLICATION FILED JULY 14, 1915.
1,193,139.
Patented Aug. 1, 1916.
2 SHEETS—SHEET 2.
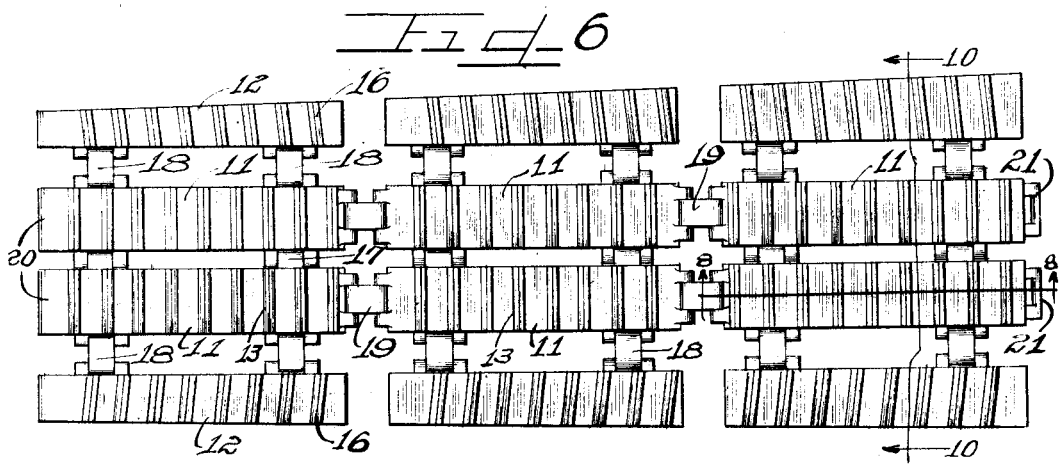
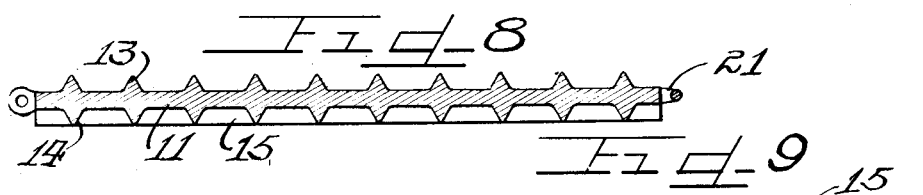
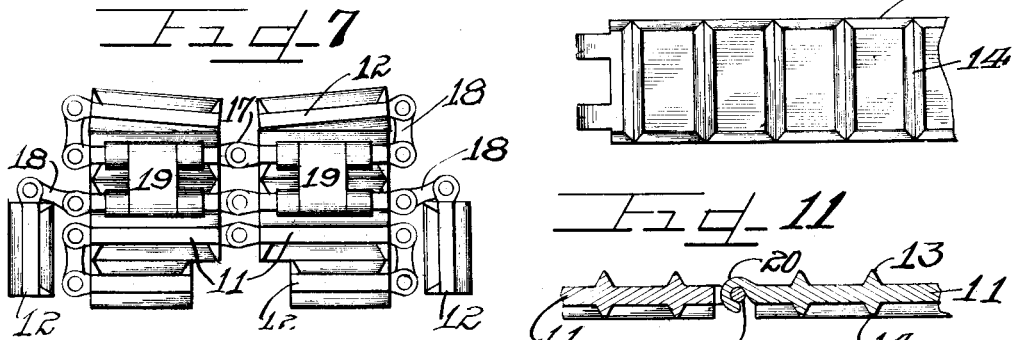
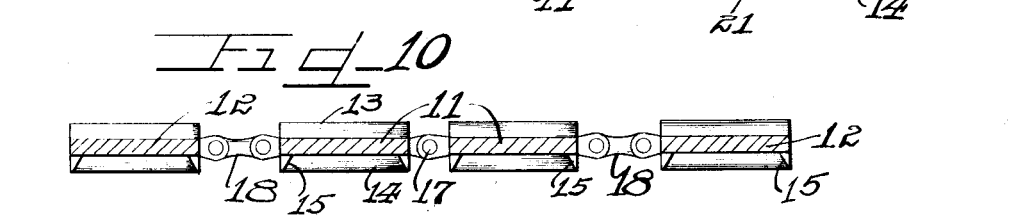
Witnesses
J. W. Angell.
Charles W. Kelley
by
Inventor
James H. Harden
Charles W. ____
Atty.

UNITED STATES PATENT OFFICE.

JAMES H. HARDEN, OF CHICAGO, ILLINOIS.

TRACTION DEVICE FOR VEHICLE-WHEELS.

1,193,139.    Specification of Letters Patent.    Patented Aug. 1, 1916.

Application filed July 14, 1915. Serial No. 39,775.

*To all whom it may concern:*

Be it known that I, JAMES H. HARDEN, a citizen of the United States, and a resident of the city of Chicago, in the county of Cook and State of Illinois, have invented certain new and useful Improvements in Traction Devices for Vehicle-Wheels; and I do hereby declare that the following is a full, clear, and exact description of the same, reference being had to the accompanying drawings, and to the numerals of reference marked thereon, which form a part of this specification.

Motor driven vehicles, either pleasure cars or trucks, are often stalled on the road by rolling into a mud or sand hole whereby one of the differentially driven wheels cannot secure proper traction to drive the vehicle. This is due to the fact that the power transmitted to the rear wheels is delivered to that wheel having the least traction, and if the same is resting in a mud or sand hole, it merely spins around without driving the vehicle.

This invention relates to a means for attachment to the wheel of a vehicle adapted to co-act with other means to be placed beneath or in the path of the wheel of the vehicle to insure positive tractive engagement for the wheel to drive the vehicle from its position.

It is an object therefore of this invention to construct means adapted to be attached to the wheel of the vehicle and adapted to co-act with flexibly constructed track mechanism laid in front of the wheel for the wheel to track thereon to insure positive tractive engagement between said means on the wheel and said mechanism.

It is also an object of this invention to construct a shoe adapted to be laced on the periphery of a wheel and provided with a plurality of corrugations or abutments for co-action with a corrugated flexible tracking device laid in front of the wheel to secure positive traction for the wheel thereover to drive the vehicle.

It is also an important object of this invention to construct a device consisting of a flexible shoe adapted to be attached upon the periphery of a wheel and having corrugations on the surface thereof, and a metallic flexibly connected toothed or corrugated link mechanism adapted to be laid in front of the wheel for co-action with the corrugations on the shoe to afford tractive engagement for the wheel.

It is furthermore an important object of this invention to construct traction devices to be placed between the wheel and the road to enable the wheel to obtain traction to drive the vehicle, consisting of flexibly connected corrugated means adapted to be folded into small space when not in use, together with means for attachment on the wheel for co-action therewith.

The invention (in a preferred form) is illustrated in the drawings and hereinafter more fully described.

In the drawings: Figure 1 is a side elevation of a wheel equipped with a device embodying the principles of my invention. Fig. 2 is an end view of the device illustrated in Fig. 1, detached from the wheel and shown partly in section. Fig. 3 is a fragmentary side elevation partly broken away and shown in section. Fig. 4 is a fragmentary transverse section of a slightly modified form. Fig. 5 is a section taken on line 5—5 of Fig. 4. Fig. 6 is a top plan view of a link mechanism adapted to be laid upon the road for co-action with the means secured upon the wheel. Fig. 7 is an end view thereof shown in folded relation. Fig. 8 is a detail section taken on line 8—8 of Fig. 6. Fig. 9 is a fragmentary bottom plan view of the link shown in Fig. 8. Fig. 10 is a detail section taken on line 10—10 of Fig. 6. Fig. 11 is a detail showing the means of connection of additional groups of linkage mechanisms one to another.

As shown in the drawings: The reference numeral 1 indicates as a whole the wheel of any vehicle whatsoever, and as clearly shown in Fig. 1, attached upon said wheel is a flexible shoe 2, secured to the wheel by lacing 3, through apertures 4, provided along the inner margin of said shoe. Said shoe 2, may be constructed of fabric, leather, or other suitable material desired, and secured on the outer surface thereof, along its central portion which is disposed on the outer periphery of the wheel, is a layer of material 5, of rubber, fiber or the like. Said layer may or may not be flexible, as desired, but in the event that the same is not flexible it is shaped to conform to the curvature of the wheel. Said layer member 5, is held rigidly secured and attached to the shoe 2, by means of a plurality of rivets 6.

A plurality of transverse corrugations or toothed members 7, are formed upon said member 5, between the rows of rivets, as clearly shown in Figs. 1 and 3. Attaching straps 8, are secured by means of rivets 9, over the exterior of the member 5, at the ends of the shoe, and are adapted, as clearly shown in Fig. 1, to be attached over the inner rim of the wheel.

In the modified form of device illustrated in Figs. 4 and 5, I have shown separate combination rib and rivet members 10, secured directly to the fabric or other material of the shoe 2.

The track member for co-action with the shoe consists of a plurality of metallic links disposed in groups of four, of which the central links are denoted by the reference numeral 11, and the side links by the reference numeral 12. As clearly shown in the sectional view in Fig. 8, which is typical of all the links, ribs 13, are formed on the upper surface of the central links 11, extending transversely thereof, and ribs 14, on the under surface thereof, with the side ribs 15, extending longitudinally along the edges of said links on the bottom surface thereof. As clearly shown in Figs. 6 and 7, ribs 16, are formed on the top and bottom surfaces of the link members 12, but are slightly inclined from the transverse axis of the links, and are so disposed as to be in staggered relation with respect to the ribs 13 and 14, on the central links 11. Each pair of the central links 11, are connected to one another by hinge connections 17, and to the respective side links 12, on each side thereof by links 18. Said central links 11, are connected one to another at their ends by links 19, and on the links 11, at one end of the complete group of links, are formed hooks 20, and at the other end of the group on the corresponding links 11, are eyes 21, enabling a series of groups of links to be attached to one another if so desired.

The operation is as follows: When the vehicle has become stalled on the road, for the reason that one of the driving wheels cannot gain sufficient traction, the shoe 2, is attached upon the periphery of the wheel and securely laced thereto, and the link track member laid in front or behind the wheel, as the case may require. The ribs on the upper surfaces of the respective links 11 and 12, serve to form a means of engagement for the ribs or abutments 7, on the shoe, so that a positive tractive engagement between the elements is assured, whereas the ribs formed on the under surface of the links 11 and 12, serve to grip into the road or other surface upon which the links are laid, to anchor the same from movement when the power is applied to the wheel. The links 11 and 12, are so associated and connected with one another as to permit the same to be readily folded into small compass to facilitate carrying of the same. For this purpose the first group of links, referring to Fig. 6, is folded inwardly over the upper surface of the intermediate group, and the last group is folded inwardly beneath the under surface of said intermediate group. The side links 12, on the respective end groups are then folded inwardly into contact with the intermediate links 11, the staggered relation of the ribs 16, on the side links and the ribs 13 and 14, on the intermediate links permitting this operation to be performed. This leaves the side links 12, of the intermediate group depending in the manner shown in Fig. 7, and the associated links may then be easily deposited in a bag or box for easy handling. The respective hook members 20, at one end of each group, and eyes 21, at the other end thereof, serve as a means for connecting a series of groups of link members together when so desired.

I am aware that various details of construction may be varied through a wide range without departing from the principles of this invention, and I therefore do not purpose limiting the patent granted otherwise than necessitated by the prior art.

I claim as my invention:

1. In a traction device of the class described, means adapted to be secured upon the wheel periphery, and flexible mechanism for coaction therewith adapted to be laid in the path of the wheel to insure tractive effect between the wheel and said means.

2. In a device of the class described, the combination with a wheel, of means attachable thereon, and a metallic link mechanism corrugated to coact with said means and adapted to be laid in the path of the wheel to insure tractive engagement between said means and said mechanism for said wheel.

3. In a device of the class described, means adapted to be secured upon a wheel, abutments thereon, and flexible link mechanism having abutments thereon adapted to receive said wheels tracking thereover to afford tractive effect on the wheel, said flexible link mechanism adapted to be folded into small compass.

4. A track member of the class described, comprising a series of metallic links connected together and adapted to be laid in the path of the vehicle wheel, said links adapted to be folded into small compass.

5. A track member of the class described, comprising a series of corrugated metallic links connected together and adapted to be laid in the path of the vehicle wheel, said links adapted to be folded into small compass.

6. A track member of the class described, comprising a plurality of metallic links, the intermediate links being flexibly connected longitudinally and the outer links being flexibly connected to said intermediate links laterally, whereby both a longitudinal and a lateral fold of said links is provided.

In testimony whereof I have hereunto subscribed my name in the presence of two subscribing witnesses.

JAMES H. HARDEN.

Witnesses:
CHARLES W. HILLS, Jr.,
EARL M. HARDINE.